(12) United States Patent
Zabulon et al.

(10) Patent No.: US 10,900,989 B2
(45) Date of Patent: Jan. 26, 2021

(54) DEVICE FOR MEASURING THE SPEEDS OF ROTATION OF AT LEAST TWO WHEELS OF AN AIRCRAFT UNDERCARRIAGE

(71) Applicant: SAFRAN LANDING SYSTEMS, Vélizy Villacoublay (FR)

(72) Inventors: Joël Zabulon, Velizy Villacoublay (FR); David Frank, Velizy Villacoublay (FR)

(73) Assignee: SAFRAN LANDING SYSTEMS, Velizy Villacoublay (FR)

( * ) Notice: Subject to any disclaimer, the term of this patent is extended or adjusted under 35 U.S.C. 154(b) by 38 days.

(21) Appl. No.: 16/213,303

(22) Filed: Dec. 7, 2018

(65) Prior Publication Data

US 2019/0178905 A1 Jun. 13, 2019

(30) Foreign Application Priority Data

Dec. 8, 2017 (FR) ...................................... 17 61874

(51) Int. Cl.
*G01P 3/488* (2006.01)
*G01P 3/487* (2006.01)
*G01P 3/486* (2006.01)
*G01P 3/489* (2006.01)

(52) U.S. Cl.
CPC .............. *G01P 3/488* (2013.01); *G01P 3/486* (2013.01); *G01P 3/487* (2013.01); *G01P 3/489* (2013.01)

(58) Field of Classification Search
CPC .......... G01P 3/488; G01P 3/489; G01P 3/486; G01P 3/487
See application file for complete search history.

(56) References Cited

U.S. PATENT DOCUMENTS

| 2009/0315541 A1* | 12/2009 | Zak | ........................ B60T 8/171 |
| | | | 324/207.2 |
| 2010/0117447 A1* | 5/2010 | Cahill | ................... B60T 8/1703 |
| | | | 303/126 |
| 2019/0054909 A1* | 2/2019 | Shah | ........................ B60T 8/76 |

FOREIGN PATENT DOCUMENTS

| EP | 2196908 A1 | 6/2010 |
| EP | 2719592 A1 | 4/2014 |
| EP | 3000729 A1 | 3/2016 |
| WO | 2004005938 A1 | 1/2004 |

OTHER PUBLICATIONS

French Search Report dated Jul. 30, 2018, issued in corresponding French Application No. 1761874, filed Dec. 8, 2017, 2 pages.

* cited by examiner

*Primary Examiner* — Akm Zakaria
(74) *Attorney, Agent, or Firm* — Christensen O'Connor Johnson Kindness PLLC

(57) ABSTRACT

A measurement device for measuring speeds of rotation of at least two wheels of an aircraft undercarriage includes a measurement unit and a processor unit associated with each wheel. The measurement unit of each wheel is configured to transform the speed of rotation of the wheel into an electrical magnitude. The processor unit of each wheel is configured to acquire the electrical magnitudes produced by at least two measurement units in order to transform the electrical magnitudes into digital measurement signals representative of the speeds of rotation of at least two wheels, and in order to transmit the digital measurement signals to external equipment.

14 Claims, 4 Drawing Sheets

DEVICE FOR MEASURING THE SPEEDS OF ROTATION OF AT LEAST TWO WHEELS OF AN AIRCRAFT UNDERCARRIAGE

CROSS-REFERENCE TO RELATED APPLICATION

This application claims priority to French Patent Application No. 1761874, filed Dec. 8, 2017, the disclosure of which is incorporated herein by reference in its entirety.

BACKGROUND

A modern system for braking aircraft undercarriage wheels conventionally makes use of an anti-lock (or anti-skid) function for the wheels on which braking is applied (referred to as "braked wheels").

The anti-lock function seeks to detect when the braked wheels are beginning to lock and to adapt the braking so as to avoid such locking.

For each braked wheel, the braking system includes a tachometer that measures the speed of rotation of the braked wheel. The measured speed of rotation is used for detecting when said braked wheel is beginning to lock.

A traditional aircraft braked wheel tachometer includes a passive sensor, e.g., a variable reluctance sensor. The passive sensor thus includes a coil having terminals across which a measurement voltage is induced, which voltage is representative of the speed of rotation of the wheel.

Attempts have been made to improve the accuracy with which the speed of rotation of the wheel is measured and to improve the sensitivity of the measurement at low speed by using an active sensor, e.g., a Hall effect sensor. Since an active sensor requires an electrical power supply in order to operate, attempts have also been made to take advantage of the availability of this electrical power supply in order to provide the tachometer with additional functions: digitizing the speed of rotation measurements, filtering, processing, transmitting digital measurements via a digital bus, etc.

Nevertheless, those additional functions make it necessary to use additional components that are more sensitive to the difficult environment at the bottom of the undercarriage than are the passive components of a traditional tachometer, and in particular they are more sensitive to the mechanical stresses and to temperature and moisture cycles.

The additional functions thus tend to reduce the reliability of the tachometer. Unfortunately, losing a tachometer of a braked wheel is highly problematic, since it has the consequence of inhibiting the anti-lock function associated with the braked wheel.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In order to achieve this object or others, there is provided examples of a measurement device for measuring speeds of rotation of at least two wheels of an aircraft undercarriage. In some embodiments, the device comprises a measurement unit and a processor unit associated with each wheel. The measurement unit of each wheel is arranged to transform the speed of rotation of the wheel into an electrical magnitude and the processor unit of each wheel is arranged to acquire the electrical magnitudes produced by at least two measurement units in order to transform the electrical magnitudes into digital measurement signals representative of the speeds of rotation of at least two wheels, and in order to transmit the digital measurement signals to external equipment.

Thus, the electrical magnitudes representative of the speeds of rotation of at least two wheels are acquired by at least two distinct processor units. A failure of one of the processor units therefore does not lead to the loss of the anti-lock function for the wheel that is associated with the failed processor unit. This improves very significantly the reliability of the anti-lock function.

Other characteristics and advantages of the present disclosure appear on reading the following description of particular, non-limiting embodiments of the present disclosure.

DESCRIPTION OF THE DRAWINGS

The foregoing aspects and many of the attendant advantages of the present disclosure will become more readily appreciated as the same become better understood by reference to the following detailed description, when taken in conjunction with the accompanying drawings, wherein.

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
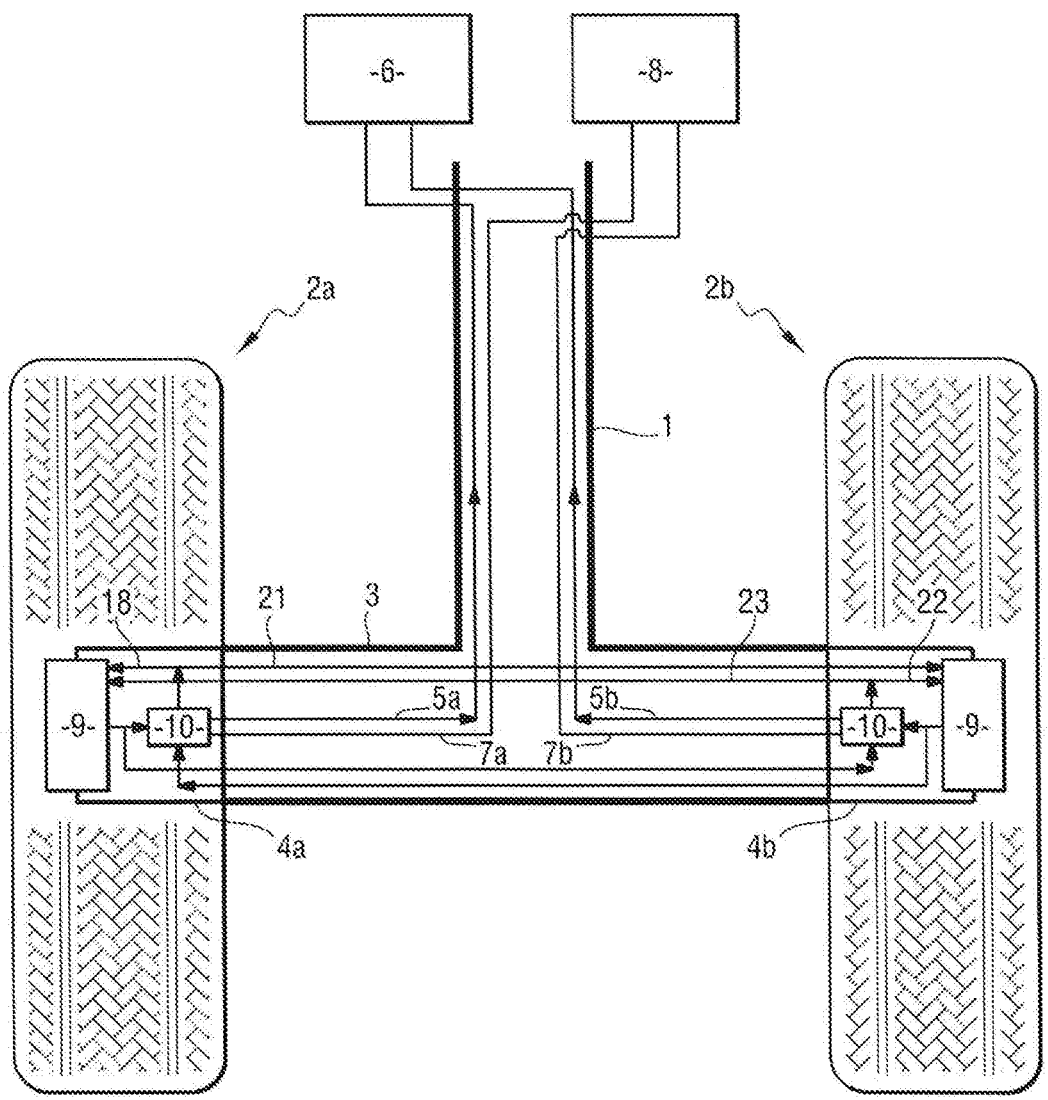
FIG. 1 shows two braked wheels of an aircraft undercarriage together with a measurement device in a first embodiment of the present disclosure.

With reference to FIG. 1, an embodiment of the present disclosure in this example is used on an aircraft undercarriage 1 that has a first wheel 2a and a second wheel 2b mounted facing each other on a common axle 3. The first wheel 2a and the second wheel 2a are braked wheels. Each of the first and second wheels 2a and 2b thus includes a respective brake for braking the wheel.

In this example, the brake of each wheel 2 is an electric brake. The brake has an actuator carrier on which electromechanical braking actuators are mounted, and friction members, for example a stack of carbon disks. The electromechanical braking actuators are used to apply a braking force on the stack of carbon disks so as to exert a braking torque on the wheel 2, thereby slowing down the rotation of the wheel 2 and thus braking the aircraft when it is on the ground.

The first wheel 2a has a first tachometer 4a and the second wheel 2b has a second tachometer 4b. The first tachometer 4a is connected by a first digital bus 5a to external equipment, specifically to a computer 6 situated in the fuselage of the aircraft. The second tachometer 4b is connected by a second digital bus 5b to the computer 6.

The first tachometer 4a is connected by a first power cable 7a to a power supply unit 8 situated in the fuselage of the aircraft. The second tachometer 4b is connected by a second power cable 7b to the power supply unit 8. The digital buses 5 and the power cables 7 run in parallel along a leg of the undercarriage 1.

The first tachometer 4a has a measurement unit 9 and a processor unit 10, which are therefore associated with the first wheel 2a. The measurement unit 9 has an active sensor 15, e.g., a Hall effect sensor.

The processor unit 10 includes, for example, an analog-to-digital converter, a processor component, a power supply component, and a communication component. In this example, the processor component is a microcontroller, but it could be some other computing component, e.g., a processor, a field programmable gate array (FPGA), an application specific integrated circuit (ASIC), etc.

The second tachometer 4b has a measurement unit 9 and a processor unit 10 similar to those of the first tachometer 4a, which are thus associated with the second wheel 2b.

Figure 2:
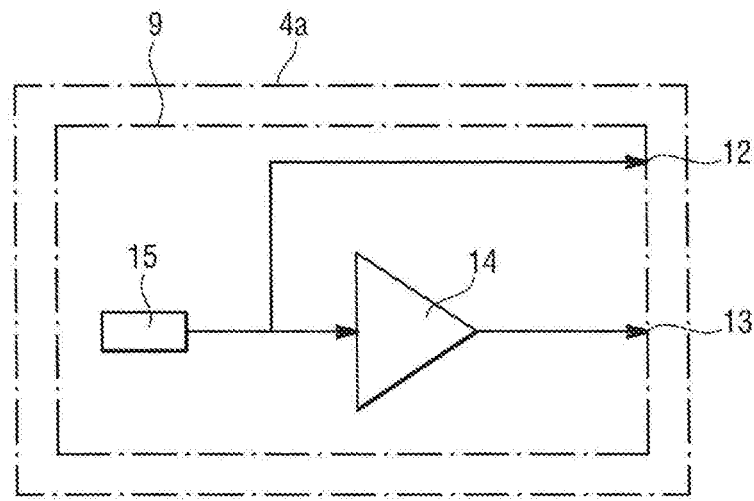
FIG. 2 shows a measurement unit of the measurement device in a first embodiment of the present disclosure.

With reference to FIG. 2, the measurement unit 9 of the first wheel 2a (i.e., the first tachometer 4a) further includes a first measurement output 12, a second measurement output 13, and an amplifier 14. The Hall effect sensor 15 of the measurement unit 9 of the first wheel 2a is connected to the processor unit 10 of the first wheel 2a via the first measurement output 12 and to the processor unit 10 of the second wheel 2b (i.e., of the second tachometer 4b) via the amplifier 14 and the second measurement output 13.

Likewise, the measurement unit 9 of the second wheel 2b (i.e., of the second tachometer) includes a first measurement output, a second measurement output, and an amplifier. The Hall effect sensor 15 of the first measurement unit 9 of the second wheel 2b is connected to the processor unit 10 of the second wheel 2b via the first measurement output and to the processor unit 10 of the first wheel 2a via the amplifier and the second measurement output.

The amplifiers serve to compensate for the difference in path lengths between a Hall effect sensor and each of the processor units 10. This avoids the output signal from the Hall effect sensor (referred to below as the "measurement voltage") being polluted, as is likely to occur when the output signal is of low amplitude, typically less than 1 volt (V).

Figure 3:
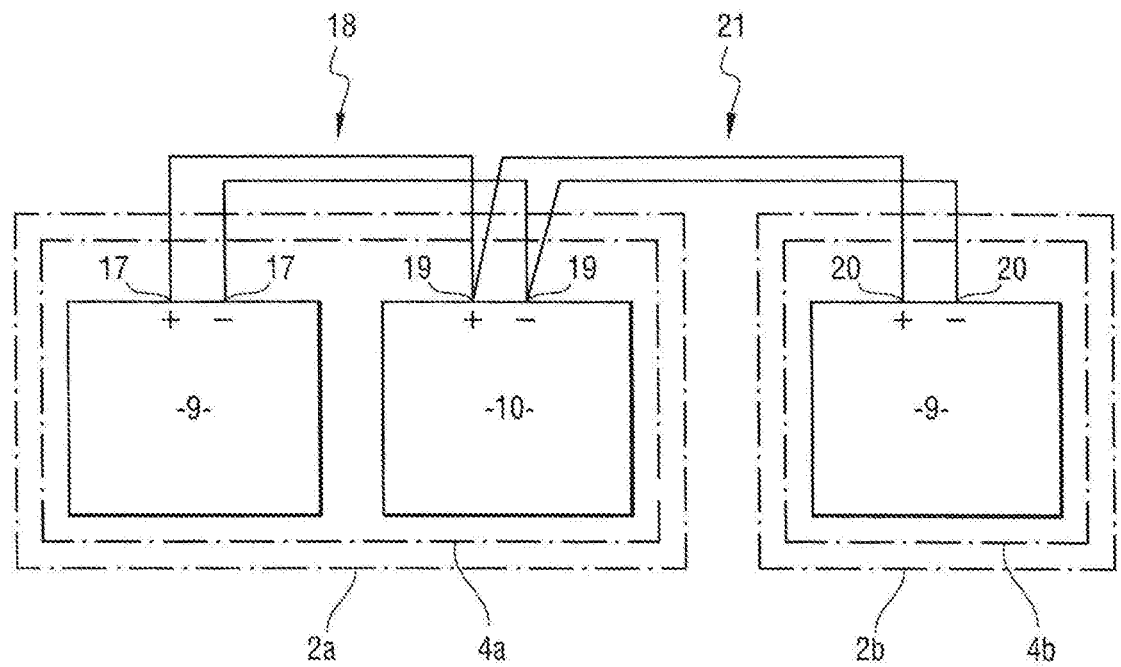
FIG. 3 shows a measurement unit and a processor unit associated with one wheel, together with a measurement unit associated with another wheel.

With reference to FIG. 3, the measurement unit 9 of the first wheel 2a includes two power supply ports 17, which are connected by a first power supply cable 18 to two power supply ports 19 of the processor unit 10 of the first wheel 2a. The measurement unit 9 of the second wheel 2b includes two power supply ports 20, which are connected by a second power supply cable 21 to the two power supply ports 19 of the processor unit 10 of the first wheel 2a. Each of the first and second power supply cables 18 and 21 comprises two conductors (or two electric wires).

In the measurement units 9 and the processor unit 10 as mentioned above, each combination 17, 19, and 20 of two power supply ports comprises a positive power supply port (i.e., a positive potential is applied to the positive power supply port) and a negative power supply port (i.e., a negative or zero potential is applied to the negative power supply port).

Likewise, the measurement unit 9 of the second wheel 2b includes two power supply ports that are connected by a third power supply cable 22 (visible in FIG. 1) to two power supply ports of the processor unit 10 of the second wheel 2b. The measurement unit 9 of the first wheel 2a includes two power supply ports, which are connected by a fourth power supply cable 23 to the two power supply ports of the processor unit 10 of the second wheel 2b.

In the measurement units 9 and the processor unit 10 as described immediately above, each set of two power supply ports comprises a positive power supply port and a negative power supply port.

The operation of the measurement device in the first embodiment will now be described in some detail.

The processor unit 10 of the first wheel 2a and the processor unit 10 of the second wheel 2b each receives a general power supply voltage from the power supply unit 8, respectively via the first power cable 7a and the second power cable 7b.

The power supply component of the processor unit 10 of the first wheel 2a transforms the general power supply voltage into a power supply voltage that the processor unit 10 uses for its own power supply, and also for powering the measurement unit 9 of the first wheel 2a, and for example the Hall effect sensor, via the first power supply cable 18.

In the event of a failure of the processor unit 10 of the second wheel 2b, the processor unit 10 of the first wheel 2a can also power the measurement unit 9 of the second wheel 2b via the second power supply cable 21.

Likewise, the power supply component of the processor unit 10 of the second wheel 2b transforms the general power supply voltage into a power supply voltage that the processor unit 10 uses for its own power supply, and also for powering the measurement unit 9 of the second wheel 2b, and for example its Hall effect sensor, via the third power supply cable 22.

In the event of a failure of the processor unit 10 of the first wheel 2a, the processor unit 10 of the second wheel 2b can also power the measurement unit 9 of the first wheel 2a via the fourth power supply cable 23.

Thus, a failure of either one of the two processor units 10 does not prevent the measurement unit 9 connected to the failed processor unit 10 from being powered, and therefore does not lead to the loss of the anti-lock function for the wheel 2 with which the failed processor unit 10 is associated.

In some embodiments, the Hall effect sensor of the measurement unit 9 of the first wheel 2a transforms the speed of rotation of the first wheel 2a into an electrical magnitude, specifically a first measurement voltage. Likewise, the Hall effect sensor of the measurement unit 9 of the second wheel 2b transforms the speed of rotation of the second wheel 2b into an electrical magnitude, specifically a second measurement voltage.

The processor unit 10 of the first wheel 2a acquires the first measurement voltage and the second measurement voltage (via the amplifier of the measurement unit 9 of the second wheel 2b). The analog-to-digital converter of the processor unit 10 of the first wheel 2a digitizes the first measurement voltage and the second measurement voltage in order to obtain digital measurement signals representative of the speeds of rotation of the first wheel 2a and of the second wheel 2b. The processor component optionally performs processing on the digital measurement signals. By way of example, the processing may comprise filtering, transforming measurement voltages into speeds of rotation of the wheel 2, and any other processing. By way of example, such other processing may comprise processing for generating an anti-lock current for powering the electromechanical braking actuators of one of the brakes or of both brakes in order to avoid one of the wheels 2 or both of the wheels 2 locking.

The communication component of the processor unit 10 of the first wheel 2a transmits the digital measurement signals, whether raw or processed, to the computer 6 via the first communication bus 5a. The raw digital measurement signals are obtained directly from the analog-to-digital conversion, whereas the processed digital measurement signals are obtained from the processing performed by the processor component.

Likewise, the analog-to-digital converter of the processor unit 10 of the second wheel 2b digitizes the second measurement voltage and the first measurement voltage in order to obtain digital measurement signals representative of the speeds of rotation of the second wheel 2b and of the first wheel 2a. The processor component optionally performs processing on the digital measurement signals.

The communication component of the processor unit 10 of the second wheel 2b transmits the (raw or processed) digital measurement signals to the computer 6 via the second communication bus 5b.

Thus, a failure of either one of the two processor units 10 does not prevent transmission of the digital measurement signals produced by the measurement unit 9 that is connected to the failed processor unit 10.

The measurement device in the first embodiment of the present disclosure provides a very significant improvement in reliability. Specifically, in each tachometer 4, the failure rate for the measurement unit 9 is well below the failure rate for the processor unit 10, since its components are simpler. Using two processor units 10 for powering each of the measurement units 9 and for transmitting the digital measurement signals via the digital buses 5 thus makes it possible practically to double the mean time between critical failures (MTBCF) of the measurement device.

The MTBCF is considered herein as being a mean time before a failure occurs that leads to the total loss of the measurement device for one of the wheels 2.

Thus, if $\lambda 1$ is the failure rate of the measurement unit 9 and $\lambda 2$ is the failure rate of the processor unit 10, then $\lambda 1 < < \lambda 2$.

The failure rate of a tachometer is:

$$\lambda = \lambda 1 + \lambda 2 \approx \lambda 2$$

For the measurement device in the first embodiment of the present disclosure, and for the above-described use of the measurement units 9 and of the processor units 10, the following applies for each tachometer 4:

$$\lambda = \lambda 1 + \lambda 2.2 \approx \lambda 2/2$$

The MTBCF is thus practically doubled.

Figure 4:
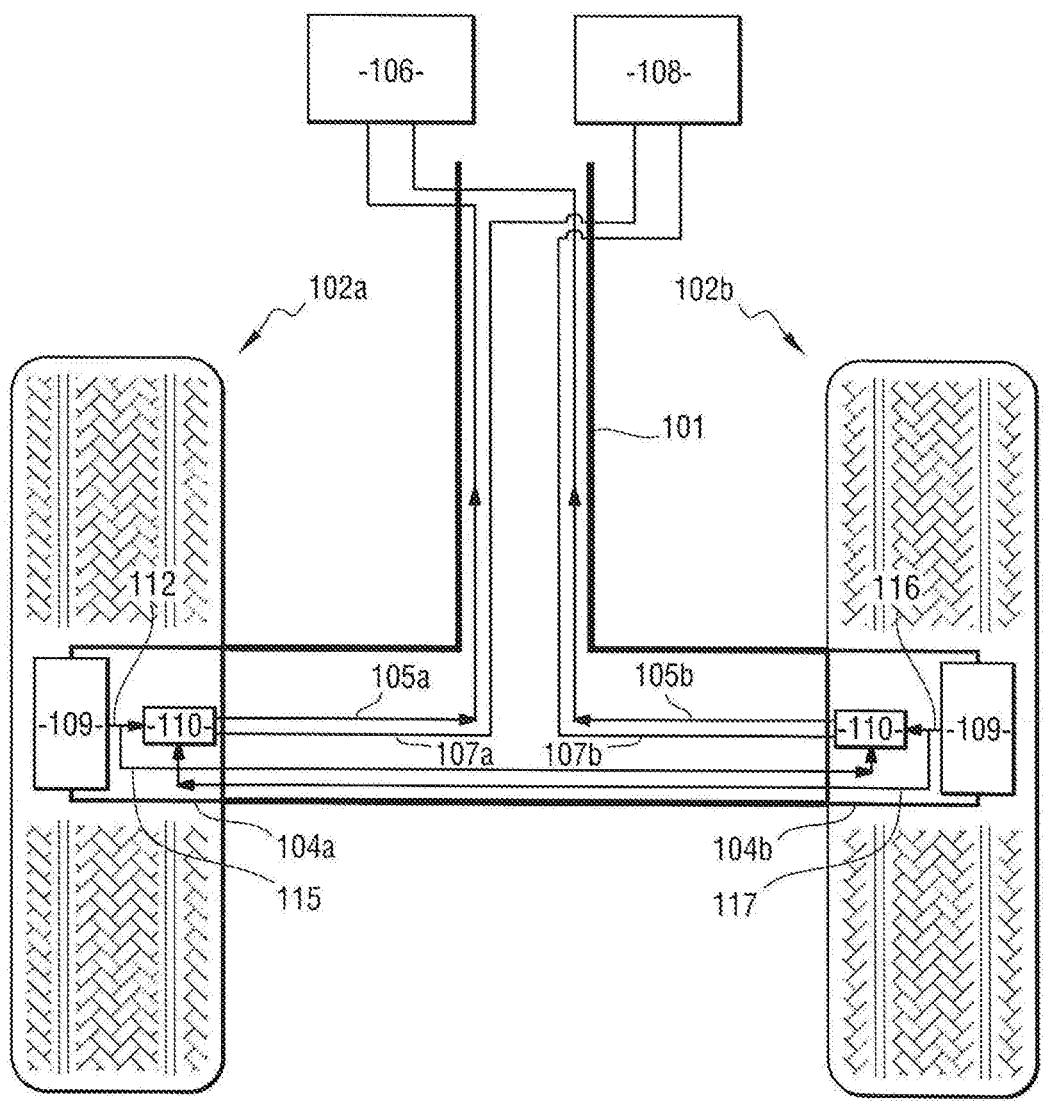
FIG. 4 shows two braked wheels of an aircraft undercarriage together with a measurement device in a second embodiment of the present disclosure.

With reference to FIG. 4, a measurement device according to a second embodiment of the present disclosure comprises once more a first tachometer 104a and a second tachometer 104b, each having a measurement unit 109 and a processor unit 110.

In this embodiment, each measurement unit 109 has a passive sensor, such as a variable reluctance sensor. Variable reluctance sensors do not need to be powered, which explains why cables equivalent to the cables 18, 21, 22, and 23 are not shown in FIG. 4 and can be omitted.

The measurement units 109 also do not include amplifiers, since the passive sensors are capable of delivering signals to equipment situated several meters away. Thus, the processor unit 110 of the first wheel 102a can acquire the second measurement voltage produced by the variable reluctance sensor of the second tachometer 104b without an amplifier being needed in the measurement unit 109 of the second tachometer 104b, and the processor unit 110 of the second wheel 102b can acquire the second measurement voltage produced by the variable reluctance sensor of the first tachometer 104b without an amplifier being needed in the measurement unit 109 of the first tachometer 104a.

Nevertheless, it is appropriate to avoid line mis-matching. The cabling between the measurement units 109 and the processor units 110 is provided in some embodiments for this purpose, which is described below.

Figure 5:
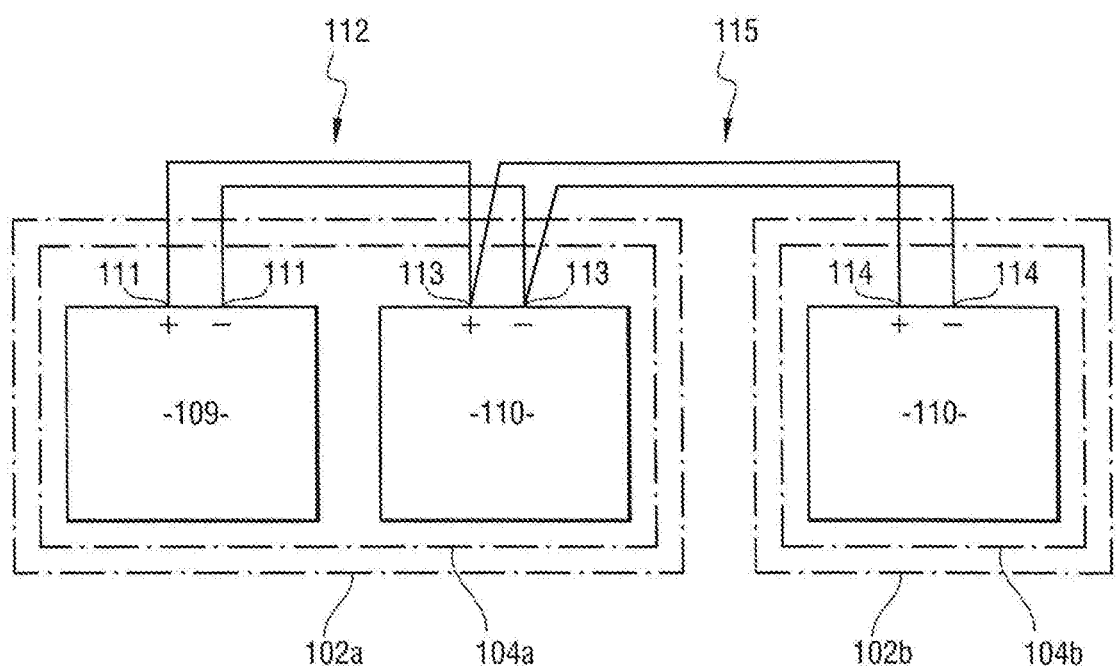
FIG. 5 shows a measurement unit and a processor unit associated with one wheel, together with a processor unit associated with another wheel.

With reference to FIG. 5, the measurement unit 109 of the first wheel 102a includes two measurement ports 111 that are connected by a first measurement cable 112 to two measurement ports 113 of the processor unit 110 of the first wheel 102a. The processor unit 110 of the second wheel 102b includes two measurement ports 114 that are connected by a second measurement cable 115 to the two measurement ports of the processor unit 110 of the first wheel 102a. Each of the first and second measurement cables 112 and 115 comprises two conductors.

In the measurement unit 109 and the processor unit 110 as described immediately above, each set 111, 113, 114 of two measurement ports comprises a positive measurement port (i.e., a positive potential is applied to the positive measurement port) and a negative measurement port (i.e., a negative or zero potential is applied to the negative measurement port).

Likewise, the measurement unit 109 of the second wheel 102b includes two measurement ports that are connected by a third measurement cable 116 to two measurement ports of the processor unit 110 of the second wheel 102b. The processor unit 110 of the first wheel 102a includes two measurement ports that are connected by a fourth measurement cable 117 to the two measurement ports of the processor unit 110 of the second wheel 102b. Each of the third and fourth measurement cables 116 and 117 comprises two conductors.

In the measurement unit 109 and the processor units 110 as described immediately above, each set of two measurement ports comprises a positive measurement port (i.e., a positive potential is applied to the positive measurement port) and a negative measurement port (i.e., a negative or zero potential is applied to the negative measurement port).

The processor unit 110 of the first wheel 102a thus acquires the first measurement voltage via the first measurement cable 112, and the second measurement voltage via the fourth measurement cable 117. The processor unit 110 of the second wheel 102b thus acquires the second measurement voltage via the third measurement cable 116 and the first measurement voltage via the second measurement cable 115.

The communication component of the processor unit 110 of the first wheel 102a transmits the digital measurement signals from the first measurement voltage and from the second measurement voltage to the computer 106 via the first communication bus 105a.

The communication component of the processor unit 110 of the second wheel 102b transmits the digital measurement signals from the second measurement voltage and from the first measurement voltage to the computer 106 via the second communication bus 105b.

The improvement in terms of reliability is thus identical with that for the measurement device of the first embodiment of the present disclosure.

The present disclosure is not limited to the embodiments described, but covers any variant coming within the ambit of the present disclosure as defined by the claims.

The brakes of non-limiting embodiments described herein are electric brakes. The present disclosure nevertheless applies to any type of brake, and for example to hydraulic brakes.

A measurement device of the present disclosure may be used on any number of wheels greater than or equal to two. Under such circumstances, each processor unit is arranged to acquire the electrical magnitudes produced by at least two measurement units.

The present disclosure may be used in a braking system of different architecture. In some embodiments, the tachometers of the two wheels need not be connected to the same computer and to the same power supply unit, the computer and the power supply unit may be incorporated in a single piece of electrical equipment, and a single computer, like a single power supply unit, may be connected to an arbitrary number of braked wheels of one or more undercarriages, etc.

It is stated herein that the active sensor may be a Hall effect sensor. Any type of power sensor that delivers an electrical magnitude representative of the measurement could be used. It is thus possible, by way of example, to use an optical sensor, a magnetoresistive sensor of the giant magnetoresistance (GMR) type, or an eddy current sensor.

It should be also understood that any block diagram, flowchart illustration, operational or method descriptions, or parts thereof, respectively, may be implemented in part by computer program instructions, e.g., as logical steps or operations executing on the the processor component. These computer program instructions may be loaded onto a computer, such as a special purpose computer or other programmable data processing apparatus, such as the processor unit 10, processor component, etc., to produce a specifically-configured machine, such that the instructions which execute on the computer or other programmable data processing apparatus implement the functions specified in any illustrated block or blocks, flowcharts, and/or the methods steps described herein in any combination, etc.

The present application may also reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A measurement device for measuring at least a first rotational speed of a first wheel and a second rotational speed of a second wheel of an aircraft undercarriage, the measurement device comprising:
 a distinct measurement unit and a distinct processor unit associated with each first and second wheel, each measurement unit of the first and second wheel being arranged to transform the respective first rotational speed and second rotational speed into an electrical magnitude, each processor unit of the first and second wheel being arranged to acquire the electrical magnitudes produced by both measurement units of the first and second wheel, to transform the electrical magnitudes into digital measurement signals representative of the first and second rotational speeds, and to transmit the digital measurement signals to an external equipment.

2. The measurement device according to claim 1, wherein each measurement unit includes an active sensor, and wherein each processor unit is arranged to power the active sensors of both measurement units.

3. The measurement device according to claim 2, wherein, for each of the first and second wheels, the measurement unit of that wheel includes a first measurement output, a second measurement output, and an amplifier, the active sensor of the measurement unit of said wheel being connected to the processor unit of said wheel via the first measurement output and to the processor unit of the other wheel via the amplifier and the second measurement output.

4. The measurement device according to claim 2, wherein, for each of the first and second wheels, the measurement unit of said wheel is connected by a first power supply cable to two power supply ports of the processor unit of said wheel, wherein the measurement unit of the other wheel is connected by a second power supply cable to the two power supply ports of the other processor unit of said wheel, and wherein the processor unit of said wheel is arranged to power the measurement unit of said wheel via the first power supply cable and the measurement unit of the other wheel via the second power supply cable.

5. The measurement device according to claim 2, wherein the active sensor is a Hall effect sensor.

6. The measurement device according to claim 1, wherein each measurement unit comprises a passive sensor, wherein, for each of the first and second wheels, the measurement unit of said wheel is connected by a first measurement cable to two measurement ports of the processor unit of said wheel, wherein the processor unit of the other wheel is connected by a second measurement cable to the two measurement ports of the processor unit of said wheel, and wherein the electrical magnitude from the measurement unit of said wheel is acquired by the processor unit of said wheel via the first measurement cable and by the processor unit of the other wheel via the second measurement cable.

7. The measurement device according to claim 6, wherein the passive sensor is a variable reluctance sensor.

8. A measurement device for measuring at least a first rotational speed of a first wheel and a second rotational speed of a second wheel of an aircraft undercarriage, the measurement device comprising:

a first measurement unit and a first processor unit associated with the first wheel, wherein the first measurement unit is configured to transform the first rotational speed into a first electrical magnitude, wherein the first processor unit is configured to acquire and transform the first electrical magnitude into a first digital measurement signal representative of the first rotational speed and to transmit the first digital measurement signal; and a second measurement unit and a second processor unit associated with the second wheel, wherein the second measurement unit is configured to transform the second rotational speed into a second electrical magnitude, the second processor unit is configured to acquire and transform the second electrical magnitude into a second digital measurement signal representative of the second rotational speed and to transmit the second digital measurement signal, wherein the first processor unit is configured to acquire and transform the second electrical magnitude and the second processor unit is configured to acquire and transform the first electrical magnitude.

9. The measurement device of claim 8, wherein the first and second measurement units include a first and a second active sensor, respectively, and wherein each of the first and second processor units are configured to power both the first and second active sensors.

10. The measurement device according to claim 9,
wherein for the first wheel, the first measurement unit includes a first measurement output, a second measurement output, and a first amplifier, the first active sensor being connected to the first processor unit via the first measurement output and to the second processor unit of the second wheel via the first amplifier and the second measurement output, wherein for the second wheel, the second measurement unit includes a third measurement output, a fourth measurement output, and a second amplifier, the second active sensor being connected to the second processor unit via the third measurement output and to the first processor unit of the first wheel via the second amplifier and the fourth measurement output.

11. The measurement device according to claim 9,
wherein the first measurement unit is connected by a first power supply cable to a first power supply port of the first processor unit and by a second power supply cable to a second power supply port of the first processor unit, wherein the second measurement unit is connected by a third power supply cable and a fourth power supply cable to the first and second power supply ports of the first processor unit, respectively, and wherein the first processor unit is configured to power the first measurement unit via the first and second power supply cables, and the second measurement unit via the third and fourth power supply cables.

12. The measurement device according to claim 9, wherein the first active sensor is a Hall effect sensor.

13. The measurement device according to claim 8,
wherein the first measurement unit comprises a first passive sensor and is connected by a first measurement cable and a second measurement cable to a first and a second measurement port of the first processor unit, respectively, wherein the second processor unit is connected by a third measurement cable and a fourth measurement cable to the first and second measurement ports of the first processor unit, respectively, and wherein the first electrical magnitude is acquired by the first processor unit via the first and second measurement cables and by the second processor unit via the third and fourth measurement cables.

14. The measurement device according to claim 13, wherein the first passive sensor is a variable reluctance sensor.

* * * * *